United States Patent [19]

Shkedi et al.

[11] Patent Number: 4,864,463
[45] Date of Patent: Sep. 5, 1989

[54] CAPACITIVE PRESSURE SENSOR

[75] Inventors: Zvi Shkedi, Tucson, Ariz.; Donald C. Lips, Manzanita, Oreg.; William H. McCormack, Tucson, Ariz.

[73] Assignee: Allied-Signal Inc., Morris Township, Morris County, N.J.

[21] Appl. No.: 183,110

[22] Filed: Apr. 19, 1988

[51] Int. Cl.[4] .......................... H01G 7/00; G01L 9/12
[52] U.S. Cl. ........................................ 361/283; 73/718
[58] Field of Search .................... 361/283; 73/718, 724

[56] References Cited

U.S. PATENT DOCUMENTS 3,232,114  2/1966  Ferran .................................. 73/718
3,697,835  10/1972 Satori .................................. 361/283
3,962,921  6/1976  Lips .................................... 73/724
3,965,746  6/1976  Rabek ................................. 73/718
4,689,999  9/1987  Shkedi ............................. 73/724 X Primary Examiner—Donald A. Griffin
Attorney, Agent, or Firm—Terry L. Miller; James W. McFarland

[57] ABSTRACT

A dual capacitive pressure sensor includes matched variable capacitors which are immune to vibration and acceleration, but which respond equally to changes in external fluid pressure level. The structure of the sensor is configured to avoid calibration drift as the sensor ages, as well as to provide electrical shielding for the variable capacitors of the sensor.

32 Claims, 3 Drawing Sheets

CAPACITIVE PRESSURE SENSOR

TECHNICAL FIELD

The present invention relates generally to a quartz pressure sensor providing a variable capacitance indicative of variable pneumatic pressure acting on the sensor. More particularly, the present invention relates to an improved capacitive pressure sensor having a dual variable capacitance providing a highly accurate indication of pressure acting on the sensor.

Pressure sensors are known in the avionics field for sensing an air pressure related to aircraft status and producing a capacitance signal indicative of, for example, aircraft altitude, mach number, air speed, angle of attack, and yaw angle. Because the derived information must be highly accurate, the sensor must also be accurate, reliable and relatively immune from electrical interference.

A system for measuring pressure usually includes an externally mounted pitot tube, a pressure conduit, a capacitive sensor which is physically acted upon by the pressure in the conduit, and electronic circuitry which has as an input the variable capacitance from the pressure sensor. Technological developments have reduced the size of the conventional sensor system to the range of 5 to 10 cubic inches in volume. Further, the technology of micromachining of silicon has progressed so that the feasibility of producing a capacitive pressure sensor comparable in size to an integrated circuit has been demonstrated.

DISCLOSURE OF THE INVENTION

Generally, the present invention in its preferred embodiment includes two pairs of confronting electrodes mounted within an evacuated housing. The housing is constructed from homogeneous fused silica glass or fused quartz material and is hermetically sealed. A variety of other materials including silicon single crystal material or insulated metallic material may also be used in constructing a sensor according to the present invention. The confronting electrodes define capacitor plates. Physical deformation of this housing under the influence of external pressure results in a change of the physical separation of each pair of electrodes. Thus, a variation in capacitance results from changes in external pressure. Throughout the entire range of pressures for which the housing is designed, the capacitance exhibited by each pair of electrodes varies simultaneously so that the capacitances of the electrode pairs are substantially identical.

More particularly, the invention provides, according to a particularly preferred embodiment, a pressure sensor having a housing defining an exteriorly exposed pressure-responsive diaphragm and an internal acceleration-compensating diaphragm, each of the diaphragms carries surface metalization coatings on each opposite face thereof, the surface metalizations of confronting faces of the two diaphragms are divided into two matching semi-circular areas. These matching and confronting semi-circular areas define a pair of capacitors which vary in capacitance as the spacing between the two diaphragms changes. Another portion of the surface metalization defines a shield which is grounded to prevent electromagnetic interference being manifest within the capacitors. This shield also prevents relative movement between the capacitor electrodes and potential charge-holding structures from being manifest as a capacitance variation in the sensor.

The compliance of the two diaphragms of the sensor is carefully matched so that acceleration and vibration will cause them to move in unison rather than differentially. As a result, the capacitance value of the pair of capacitors is substantially immune from influence by vibration and acceleration forces. Also, the capacitance values of the two capacitors change in unison and by like amounts in response to external pressure acting upon the externally exposed diaphragm in concert with a reference pressure within the pressure sensor. Consequently, the capacitance values of the pair of capacitors are at all times substantially equal.

BRIEF DESCRIPTION OF THE DRAWINGS

Further advantages of the invention will become apparent from the following description and claims, and from the accompanying drawings wherein:

BEST MODE OF CARRYING OUT THE INVENTION

Figure 1:
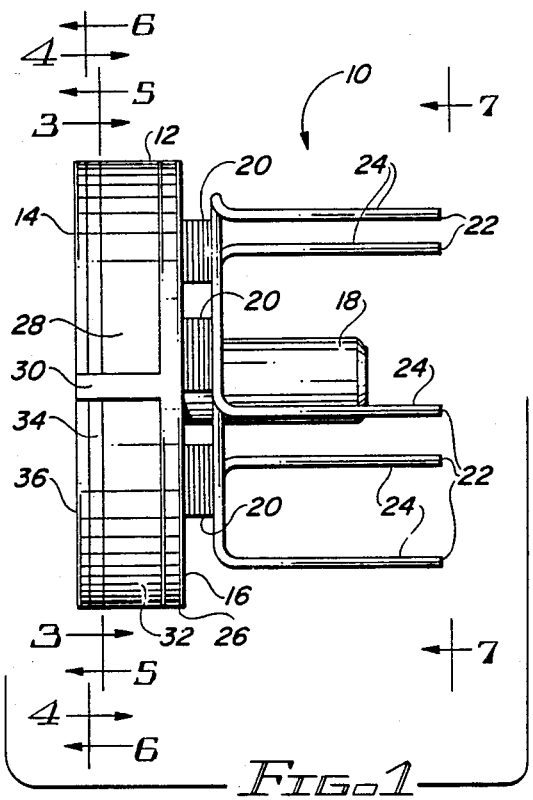
FIG. 1 is a side view of the capacitive pressure transducer.

FIG. 1 depicts a side view of a sensor (10) embodying the present invention. The sensor (10) includes a body (12) of generally cylindrical shape having both a flat top surface (14) and a flat lower surface (16). A mounting stem (18) is centrally disposed upon the body (12) and projects axially from the lower surface (16) in order to provide a means for physically attaching the sensor (10) to a mounting structure, such as a circuit board or chassis. Also protruding from the lower surface (16) of the housing (12) are a plurality of electrical pin mounting anchors (20) each carrying an axially extending electrical lead (22) or electrical pin. The pin mounting anchors (20) and electrical leads (22) are five in number, and each of the latter includes an axially extending shape-retaining portion (24). The electrical leads (22) also include provision for axial and radial compliance as will be more fully described hereinbelow.

Further consideration of FIGS. 1-7 will reveal that the sensor (10) includes a band (26) of exterior surface metalization encompassing the body (12) on a side surface (28) thereof adjacent to the lower surface (16). The band (26) of exterior surface metalization is circumferentially continuous, and a pair of diametrically oppositely disposed axially extending portions (30) (only one of which is visible in FIG. 1) of exterior surface metalization connect with the band (26) and extend therefrom axially along the side surface (28) to the top surface (14). As will be more fully explained hereinbelow, the exterior metalization on the sensor (10) covers almost all of the base surfaces (16), and almost all of the top surface (14) as well. The exterior surface metalization on sensor (10) is electrically continuous with one of the pin mounting anchors (20) and the respective electrical lead (22) extending therefrom.

It will be seen viewing FIGS. 1-7 that the housing (12) includes three axially stacked and sealingly intersecured portions, a lower portion (32) carries the pin mounting anchors (20) and mounting stem (18) as well as the band of surface metalization (26). Atop the lower portion (32) are sequentially stacked a middle layer (34) which is much thinner in axial extent than the lower portion (32) and a top layer (36) which is substantially equal in axial dimension with the middle layer (34).

Figure 2:
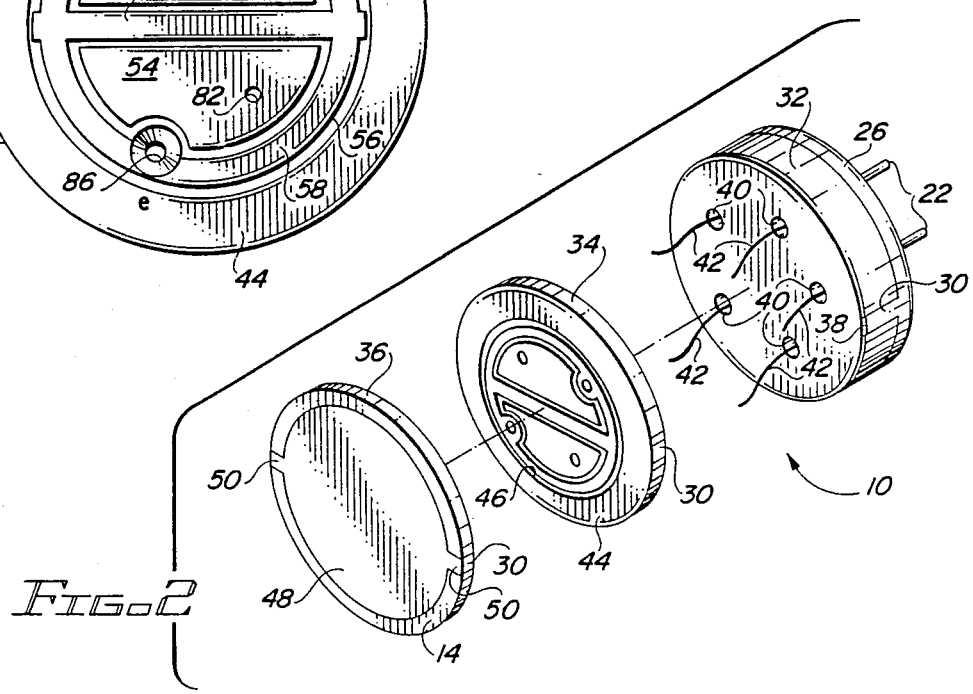
FIG. 2 is an exploded isometric view of the capacitive pressure transducer of FIG. 1.

Turning now in particular to FIG. 2, it will be seen that the lower portion (32) defines a planar upper surface (38) confronting the middle layer (34). The lower portion (32) also defines five circumferentially spaced passages (40) extending therethrough to open on the lower surface (16). Each one of the passages communicates with a respective one of the pin mounting anchors (20), as will be more fully explained hereinafter. Received within each one of the passages (40) is a respective one of five flexible electrical leads (42). These leads (42) are electrically continuous with a respective one of the pin anchors (20) and electrical leads (22). FIG. 2 also reveals that the middle layer (34) includes a radially outer rim portion (44) as well as a central upper recess (46) which confronts the top layer (36). This top layer (36) carries a central exterior surface metalization portion (48) which is electrically connected with the axially extending portions (30) of exterior surface metalization on the side surfaces (28) by a pair of oppositely radially extending surface metalization portions (50).

Keeping in mind that which has been depicted and described with reference to FIGS. 1 and 2, reference now particularly to FIGS. 3-6 in conjunction will show that the upper face of middle layer (34) confronting the top layer (36) carries three electrically separate surface metalization portions (52), (54) and (56) (viewing particularly FIG. 4). The surface metalization portions (52) and (54) are spaced apart circular segments. That is, the portions (52) and (54) are of semi-circular shape. On the other hand, the surface metalization portion (56) comprises an annular part (58) and a cross-bar part (60) joining at each of its ends with the annular portion (58) and separating the surface metalization portions (52) and (54). As an assistance to the viewer, alphabetic alignment characters have been placed upon FIGS. 3 through 6 in order to assist in visualizing the congruent features which provide for electrical connection of electrical leads (22) carred upon the lower portion (32) of the sensor with the various internal features thereof.

Figure 5:
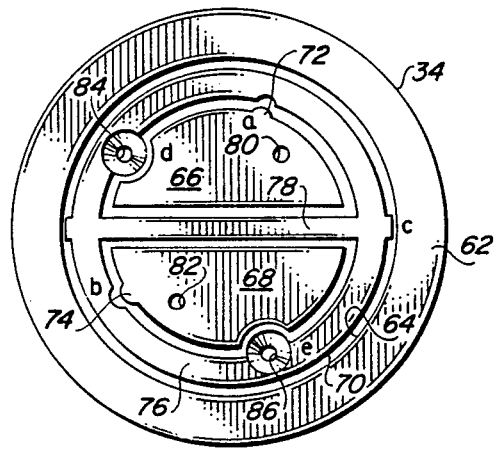
FIG. 5 is a bottom view of a portion of the capacitive pressure transducer of FIG. 1 taken along line 5—5 of FIG. 1.

Viewing FIG. 5 it will be seen that the lower face of middle layer (34) also includes a radially outer annular rim portion (62) like rim portion (44) of the opposite upper face of middle layer (34). Similarly, the lower face of the middle layer (34) includes a recess (64) within the rim portion (62) and three portions of surface metalization (66), (68) and (70). The portions (66) through (70) of surface metalization on the lower face of middle layer (34) are congruent and substantially identical in shape with the portions of surface metalization (52) through (56) of the top face of this layer. However, the surface metalization portions (66) and (68) include respective radially projecting portions (72) and (74) which align with respective ones of the passages (40) in lower portion (32) and receive electrical connection with the respective flexible electrical lead (42) thereof (alignment references 'a' and 'b'). It will be noted that the surface metalization portion (70) similarly to surface metalization portion (56) includes an annular portion (76) and a cross-bar part (78). Viewing FIG. 5, it will be noted that the intersection of cross-bar part (78) with annular part (76) of surface metalization (70) corresponds at the right end thereof with one of the passages (40) of lower portion (32) (alignment reference 'c'). Accordingly, the connector (42) received in this passage connects with the metalization portion (70) adjacent this intersection.

It will also be noted that the middle layer (34) defines four through passages referenced with the numbers (80) through (86). Two of these through passages (80) and (82) open in the surface metalization portions (52) and (66), and (54) and (68), respectively. In order to electrically connect these surface metalization portions, the cylindrical surfaces of the two through passages (80) and (82) are also coated wth surface metalization. The other two through passages (84) and (86), it will be seen, each encroach upon the annular part of surface metalization portions (56) and (70). The through passages (84) and (86) are each larger in diameter than the through passages (80) and (82) and also include a chamfer region adjacent to the opposite faces of the middle layer (34). In order to electrically connect the surface metalization portions (56) and (70), the conical chamfer surfaces of the through passages (84) and (86) are also covered with surface metalization.

Figure 6:
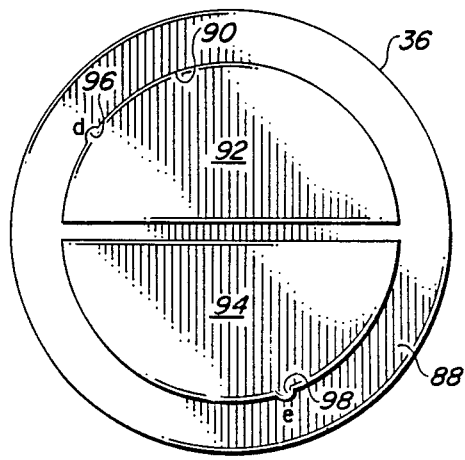
FIG. 6 is a bottom view of another portion of the capacitive pressure transducer of FIG. 1 taken along lines 6—6 of FIG. 1.

Turning now to FIG. 6 it will be seen that the underside of top layer (36) also includes an annular rim (88). Within the rim (88) the top layer (36) defines a recess (90) congruent with the recesses (46) and (64) of the middle layer (34). Within recess (90) the top layer (36) carries two portions of surface metalization (92) and (94) which are similarly semi-circular in shape, which are confrontingly spaced from and overlay the surface metalization portions (52) and (54), and which at least partially overlap with the metalization portion (56). Similarly with the surface metalization portions (66) and (68), the surface metalization portions (92) and (94) include areas (96) and (98) aligning with the through passages (84) and (86) of middle layer (34), and providing for electrical connection of a respective lead (42) to each one of the metalization portions (92) and (94) (alignment references 'd' and 'e').

Figure 3:
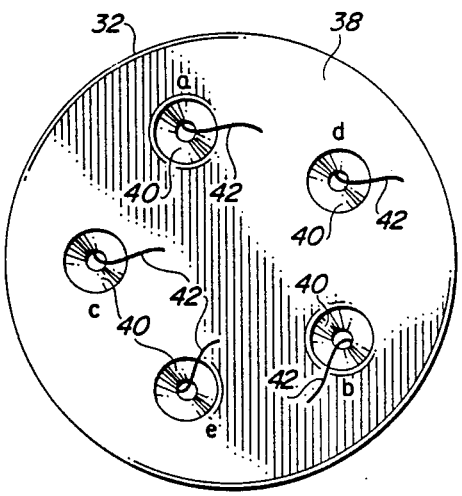
FIG. 3 is a top view of a portion of the capacitive pressure transducer of FIG. 1 viewed along line 3—3.
Figure 4:
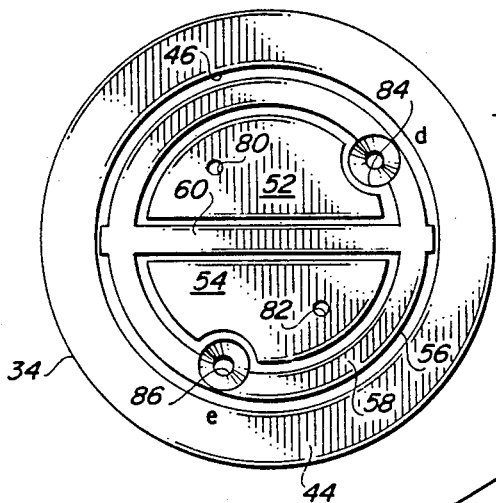
FIG. 4 is a top view of another portion of the capacitive pressure transducer of FIG. 1 taken along line 4—4 of FIG. 1.

Viewing the alignment features previously referred to, the character 'a' in FIG. 3 designates a passage (40) and electrical lead (42) which on FIG. 5 aligns with the radially extending portion (72) of surface metalization (66) so that the lead (42) may connect therewith. Similarly the character 'b' on FIG. 3 designates a passage (40) and lead (42) which aligns with the projecting portion (74) of surface metalization (68) shown in FIG. 5 so that the lead (42) may connect thereto. The character 'c' shown in FIG. 3 adjacent to the passage (40) and electrical lead (42) align with the intersection of cross-bar part (78) and annular part (76) of surface metalization (70) shown in FIG. 5 so that the lead (42) may connect thereto. Also shown in FIG. 3 the characters 'd' and 'e' designate passages (40) and respective electrical leads (42) which align with passages (84) and (86) respectively of the middle layer (34) as seen in FIGS. 4 and 5 and pass therethrough to connect with the surface metalizations (92) and (94) of upper layer (36) as seen in FIG. 6 at the respective areas (96) and (98) thereof.

Figure 7:
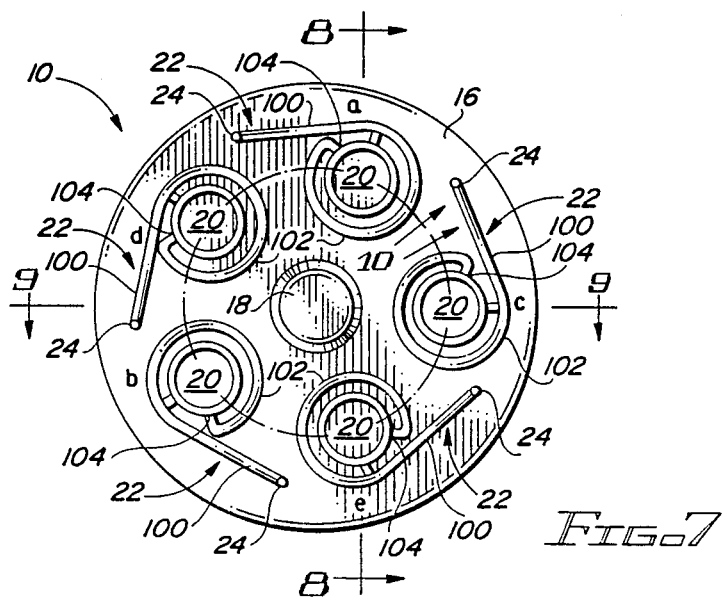
FIG. 7 is a bottom view of the capacitive pressure transducer of FIG. 1.

In order to complete this description of the physical structure of sensor (10), the reader's attention is called to FIG. 7 wherein a view of the lower surface of the sensor is depicted. It will be seen viewing FIG. 7 that each one of the electrical leads (22) includes a radially extending portion (100) connecting the axially extending portion (24) of the lead with a circumferentially extending portion (102). The circumferentially extending portion (102) is seen to circumscribe and be spaced from the pin mounting anchor (20) while extending therearound through substantially 360° before attaching mechanically and electrically thereto at a joint reference with the numeral (104). This construction of the electrical leads (22) provides for both radial and axial movement of the axially extending portion (24) of the lead relative to the pin mounting anchors (20) without transmitting significant loads into the body (12) of the sensor (10).

Figure 8:
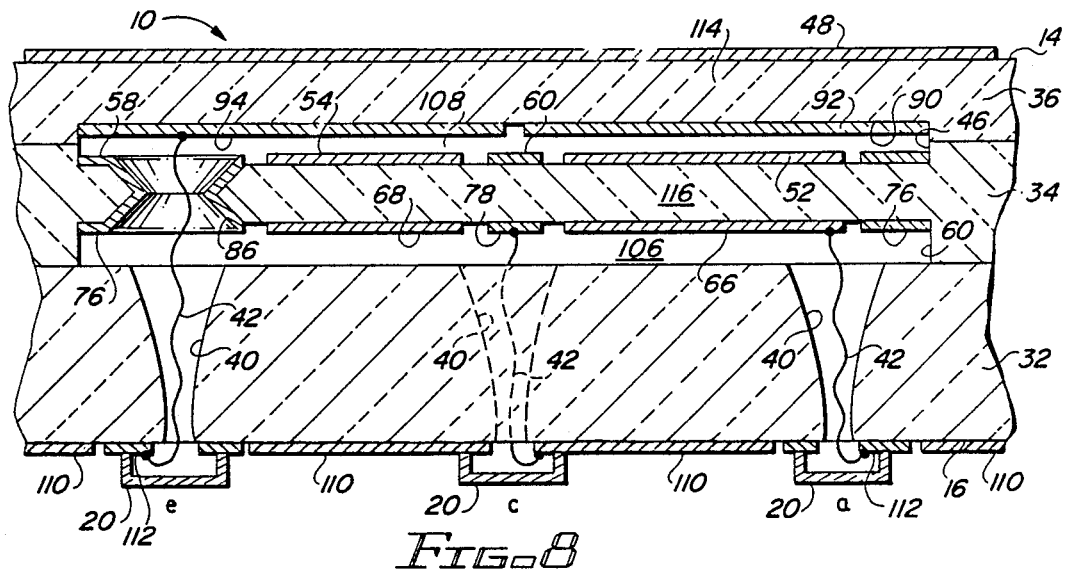
FIG. 8 is a fragmentary somewhat schematic cross-sectional view of the capacitive pressure transducer of FIGS. 1 and 7, taken along line 8—8 of FIG. 7.
Figure 9:
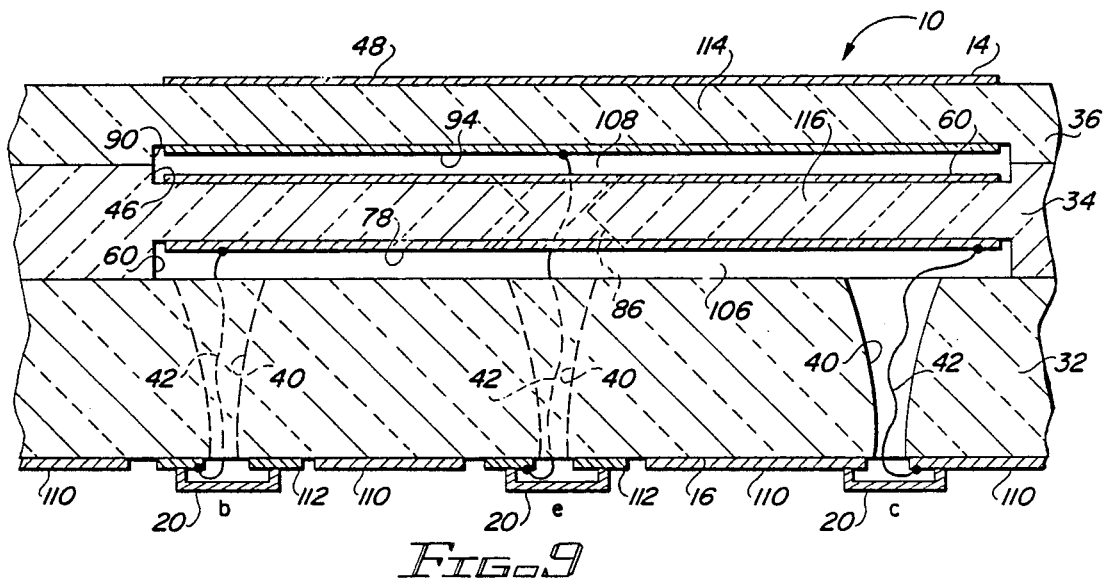
FIG. 9 is a fragmentary somewhat schematic cross-sectional view of the capacitive pressure transducer of FIGS. 1 and 7 taken along line 9—9 of FIG. 7.
Figure 10:
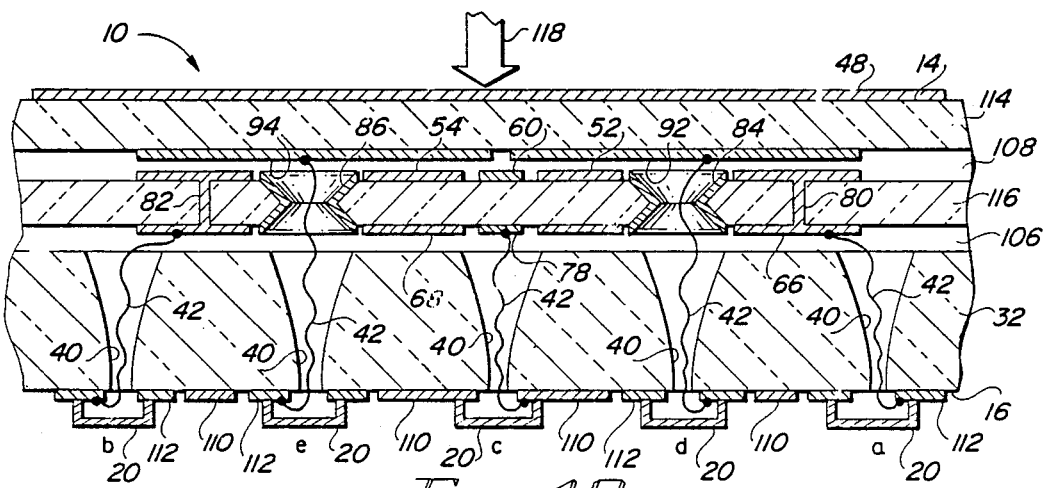
FIG. 10 is a somewhat schematic cross-sectional view of the capacitive pressure sensor taken along circular line 10—10 of FIG. 7.

Turning now to FIGS. 8, 9 and 10 in conjunction the cross-sectional views of the sensor (10) are depicted somewhat schematically in order to present the structural and functional cooperation of the components depicted and described heretofor. As an assistance to the reader, the alignment alphabetic key letters 'a' through 'e' used previously to depict the congruence and cooperation of features depicted in FIGS. 3 through 6 are carried over in FIGS. 8 through 10. FIGS. 8 through 10 illustrate that the recess (60) of middle layer (34) cooperates with the planar upper surface (38) of the lower portion (32) of the sensor to define a chamber (106). Similarly, the recesses (46) and (90) of the middle layer (34) and top layer (36) cooperate to define a chamber (108). Of course, the chambers (106) and (108) are communicated with one another via the through passages (80) through (86). The chambers (106) and (108) cooperatively define a reference pressure chamber for the sensor (10). The chambers (106) and (108) are partially evacuated so that capacitance value of the sensor is an indication of absolute pressure level acting thereon. Preferably, as close to an ideal vacuum as possible is created in chambers (106,108).

It will be seen viewing FIGS. 8 through 10 that the pin mounting anchors (20) are depicted as conductive cup-like members sealingly securing to the lower surface (16) of the lower portion (32) of the sensor (10) and spanning the through passages (40) to close the latter and chambers (106) and (108) from atmospheric pressure. The lower surface (16) of sensor (10) is substantially completely covered with exterior surface metalization (110) which is continuous with the band (26). The surface metalization (110) immediately circumscribes the one through passage (40) at alignment reference 'c'. The pin mounting anchor (20) at this through passage is secured to the surface metalization (110), as is the lead (42) connecting with metalization portion (70) on sensor portion (34). Consequently, a grounded shield structure is completed which includes surface metalization portions (26), (30), (48), (50), (56), and (70).

The surface metalization (110) circumscribes the remaining passages (40) at some distance therefrom. Surrounding each of the remaining through passages (40) on surface (16) (alignment references a, b, d, and e) is a respective annular area of surface metalization generally referenced with the numeral (112). Each of the mounting pin anchors (20) at these passages is secured to its respective annulus of surface metalization, as is the respective lead (42) thereof. Of course, it is understood that the electrical leads (22) depicted in FIGS. 1 and 7 respectively connect to the exterior surface of the pin mounting anchors (20) as has been previously described.

Viewing now most particularly FIG. 10, it will be understood that the top layer (36) of the sensor defines a flexible diaphragm part (114) spanning the recess (90) thereof. Similarly, the middle layer (34) defines a flexible diaphragm part (116) spanning the recesses (46) and (60) thereof. The flexible diaphragm parts (114) and (116) of the layers (34) and (36) are substantially the same in compliance. Therefore should the sensor (10) depicted in FIG. 10 be subjected to acceleration or vibration forces oriented vertically with respect to the figure, the diaphragm parts (114) and (116) will deflect or vibrate substantially in unison. Consequently, the spacing between the metalization portions carried upon the top layer and middle layer (34) and (36), respectively, will not change. In this way it is seen that the sensor (10) is substantially immune to influence from vibration and acceleration forces.

On the other hand, should the sensor (10) be exposed to a fluid pressure, as is depicted by arrow (118), it is easily understood that the diaphragm part (114) of top layer (36) is bowed convexly inward toward the chamber (108), to result in the metalization layers carried upon the diaphragm parts being forced closer together. Consequently the variable capacitors defined by the respective congruent metalization portions change in value predictably in accord with the level of the fluid pressure applied externally to the sensor (10). It further is to be noted that the capacitors defined by the surface metalization layers are substantially identical with respect to the area of their confronting capacitor plates and that the change in spacing of these capacitor plates in response to applied external pressure is substantially the same for each of the two capacitors. Therefore, the capacitance values of the pair of capacitors change by the same amount so that at all times and in response to the full range of fluid pressures for which the sensor (10) is designed, the capacitance values are substantially identical.

Further to the above, it will be seen that each of the diaphragms (114) and (116) carries substantially equal surface metalization on each of its opposite faces. This feature is important in maintaining calibration of the transducer over time as the metalization films age and stresses therein relax. Without substantially equal surface metalization on its two opposite faces, a diaphragm will bow in response to a bi-metal effect as the stresses in the metal film relax over time. The present invention provides diaphragms with substantially balanced surface metalization. Also, it is to be noted that the crossbar portions (60) and (78) of the diaphragms lie on a plane of bilateral symmetry for the sensor (10). That is, each structure on one side of the plane is substantially duplicated on the other side of the plane. This feature is important in achieving equal capacitance change for each of the variable capacitors as external pressure on the sensor changes.

While the present invention has been depicted and described by reference to a single preferred embodiment of the invention, such reference is not intended as a limitation upon the invention and no such limitation is to be inferred. The invention is intended to be limited only by the spirit and scope of the appended claims which also provide additional definition of the invention.

We claim:

1. A capacitive pressure sensor comprising:
   a housing including a pair of spaced apart diaphragms matched in compliance to vibrate and deflect in substantial unison in response to vibratory and acceleration forces, respectively; an outer pressure responsive one of said pair of diaphragms movably cooperating with said housing to bound a reference-pressure chamber within which is movably disposed the other of said pair of diaphragms;
   said other diaphragm carrying a first pair of spaced apart planar electrodes confronting said one diaphragm and each of a certain geometric shape, and a first planar shield electrode having a portion circumscribing said first pair of electrodes and a cross bar portion interposing between said first pair of electrodes;
   said one diaphragm carrying a second pair of spaced apart planar electrodes confronting said other diaphragm and said first pair of electrodes thereon and each of said certain geometric shape;
   said first pair of electrodes and said second pair of electrodes being congruent to define a respective pair of variable capacitors each of substantially identical value and varying in capacitance value simultaneously in union as said one diaphragm moves in response to external fluid pressure, whereby said variable capacitors remain of substantially identical value in response to external fluid pressure acting on said sensor, and said capacitance values being substantially immune from said vibration and acceleration forces.

2. The invention of claim 1 wherein said first and second pairs of electrodes and said shield electrode cooperatively define a plane of bilateral symmetry in said sensor.

3. The invention of claim 1 wherein said other diaphragm also carries a third pair of spaced apart planar electrodes disposed away from said one diaphragm and each of said certain geometric shape, said first pair of electrodes and said third pair of electrodes interconnecting electrically, and a second planar shield electrode having a portion circumscribing said third pair of electrodes and a diametral cross bar portion interposing between said third pair of electrodes, said first shield electrode and said second shield electrode interconnecting electrically.

4. The invention of claim 3 wherein said other diaphragm defines a pair of through passages each respectively opening at opposite ends on separate ones of said first pair of electrodes and on individual ones of said third pair of electrodes, and a conductive metal coating on each one of said pair of through passages respectively connecting said pairs of electrodes.

5. The invention of claim 3 wherein said other diaphragm defines a through passage opening at opposite ends on said first and said second shield electrodes, and a metallic film coating on said passage electrically interconnecting said shield electrodes.

6. The invention of claim 1 wherein said sensor further includes a metallic film shield electrode covering at least a portion of the external surface of said housing.

7. The invention of claim 6 wherein said metallic film shield electrode includes a portion carried upon said one diaphragm and congruent with said first and second pairs of electrodes.

8. The invention of claim 6 wherein said metallic film shield electrode includes a band portion circumscribing said housing and in plan view of said pair of electrodes also circumscribing the latter.

9. The invention of claim 1 wherein said housing comprises a disc-like base portion, a disc-like yieldable middle portion, and a disc-like yieldable top portion, said portions being stacked and sealingly united to define said reference pressure chamber, said housing top portion defining said one diaphragm, and said housing middle portion defining said other diaphragm.

10. The invention of claim 9 wherein one of said housing portions defines a comparatively thicker annular rim part sealingly uniting with the other of said housing portions, and a comparatively thinner yieldable part spanning said rim part and defining one of said pair of diaphragms.

11. The invention of claim 10 wherein another of said housing portions also defines a respective comparatively thicker annular rim part sealingly uniting with the other of said housing portions, and another comparatively thinner yieldable part spanning said another rim part and defining the other of said pair of diaphragms.

12. The invention of claim 9 wherein said base portion carries conductive means for electrical connection individually with each one of said first pair of electrodes, with each one of said second pair of electrodes, and with said first and second shield electrodes together.

13. The invention of claim 12 wherein said conductive connection means includes a plurality of through passages defined by said base portion, a like plurality of flexible conductors received in respective ones of said plurality of through passages and electrically connecting at respective inner ends with respective ones of said electrodes, and a like plurality of cup-like conductive anchor members sealingly engaging said base portion to close respective ones of said plurality of through passages and electrically connecting internally thereof with respective ones of said plurality of flexible conductors at the outer ends of the latter.

14. The invention of claim 13 wherein said conductive connection means further includes an electrical lead connecting with one of said anchor members, said electrical lead including a shape retaining axially extending portion having a free end for interface with electrical circuitry external to said sensor, a circumferentially extending resilient portion joining with said shape retaining axially extending portion at the end of the latter opposite said free end, said resilient portion extending circularly around and being spaced apart from said anchor member through substantially 360° to yieldably provide for axial and radial relative movement of said axially extending portion, and an inner part of said electrical lead anchoring said resilient portion with said anchor member externally thereon.

15. The invention of claim 1 wherein said housing is formed substantially of fused quartz material.

16. The invention of claim 1 wherein said certain geometric shape is a circular segment shape or semi-circle.

17. A capacitive pressure sensor comprising a housing including a pair of spaced apart circular diaphragm members matched in compliance to vibrate and deflect in substantial unison in response to vibratory and acceleration forces effective thereon, an outer one of said pair of diaphragm members bounding a reference-pressure chamber within which is movably disposed the other of said pair of diaphragm members; and said one diaphragm member deflecting in response to fluid pressure differential thereacross to move relative said other diaphragm member, first surface metalization film means carried by said pair of diaphragm members on confronting surfaces thereof for defining a pair of matched variable capacitors varying in capacitance value equally in response to relative movement of said pair of diaphragm members and for defining a plane of bilateral symmetry for said sensor, and second surface metalization film means carried also by said pair of diaphragm members on oppositely disposed surfaces thereof for balancing surface metalization residual stresses on each of said pair of diaphragm members, said second surface metalization film means including a portion thereof carried upon said one diaphragm member externally of said sensor for electrically shielding said pair of capacitors.

18. A capacitive pressure sensor comprising a housing defining a closed reference pressure chamber therewithin, a pair of yieldable shape retaining diaphragm members matching in weight and resilience to vibrate and deflect substantially equally in unison in response to vibratory and acceleration forces, respectively; one of said pair of diaphragm members cooperating with said housing to bound said reference-pressure chamber on one side thereof and having another opposite side thereof exposing to ambient pressure to movingly respond according to pressure differences thereacross, the other of said pair of diaphragm members being movably disposed within said reference pressure chamber in isolation from ambient pressure, and means carried by said pair of diaphragm members for defining a pair of variable capacitors matching in capacitance value and changing capacitance value in unison equally in response to differential movement of said pair of diaphragm members resulting from deflection of said one diaphragm member in response to said pressure differential thereacross, whereby said pair of variable capacitors are not changing in capacitance value in response to vibration or acceleration forces affecting the pair of diaphragms equally, said variable capacitor defining means including said pair of diaphragm members defining respective confronting circular shaped axially spaced apart surfaces thereon, a pair of laterally spaced apart metallic film coatings on each of said circular surfaces of said pair of diaphragm members, each individual metallic film coating being of circular segment shape confrontingly congruent and spaced from a matching respective metallic film coating on the other of said pair of diaphragm members, and a metallic film coating shield electrode carried upon said other diaphragm member and including an annular portion circumscribing said pair of film coatings thereon and a diametral cross bar portion interposing between said pair of laterally spaced apart film coatings on said other diaphragm member.

19. The invention of claim 18 wherein said housing includes three disc-like axially stacked and sealingly united portions of like diameter, a base portion of said three portions being comparatively thick and unyielding and carrying a middle portion and a top portion both of which are comparatively thinner and yielding; said middle housing portion including an annular rim part engaging said base portion and a circular recess within said rim part on at least one of the opposite faces thereof to define a still thinner yielding portion spanning said rim part, said housing middle portion spanning said rim part defining said other diaphragm member, said top housing portion similarly defining a respective annular rim part engaging said rim part of said middle housing portion, and a respective circular recess within said respective rim part defining a respective still thinner yielding portion spanning said respective rim part, said respective portion spanning said rim part of said top housing portion defining said one diaphragm member, and said circular recess of said top housing portion defining the respective one of said pair of circular areas for receiving a respective pair of said metallic film coatings.

20. The invention of claim 19 wherein said recesses on said middle and top housing portions cooperatively define a pair of cavities which are communicated by a through passage in said middle housing portion to define said reference-pressure chamber, said base portion defining a plurality of electrical connection means extending therethrough from a lower mounting surface thereof to said reference-pressure chamber for connecting individually with said variable capacitor means metallic film coatings, and with said shield electrode.

21. The invention of claim 20 wherein said electrical connection means includes said base portion defining a plurality of through passages each opening to said reference-pressure chamber, a like plurality of conductive pin anchor members sealingly attaching to said base portion at said lower mounting surface thereof and closing respective ones of said through passages, a like plurality of flexible conductors received respectively in said plurality of through passages and connecting respective ones of said pin anchor members individually with one of said variable capacitor means metallic film coatings or with said shield electrode.

22. The invention of claim 21 wherein said middle housing portion defines a pair of through passages, a pair of said plurality of flexible conductors passing respectively through said pair of through passages and connecting individually with respective ones of said pair of metallic film coatings of said top housing portion one diaphragm.

23. The invention of claim 21 wherein said plurality of pin anchor members each carry a respective one of a like plurality of yieldably shape-retaining electrical leads, each one of said plurality of electrical leads including an elongate wire form securing at one end thereof to said anchor member and extending radially outwardly and tangentially therefrom to circumscribe said anchor member through substantially 360° or more and being radially spaced therefrom, said electrical lead then turning 90° to extend axially away from said housing to terminate in an opposite end thereof.

24. The method of providing a pair of variable capacitances of substantially equal value which vary in value in unison and substantially equally in accord with the level of a physical parameter to be measured and which do not substantially vary in response to vibratory and acceleration forces acting thereon, said method comprising the steps of:
    providing a pair of juxtaposed spaced apart yieldably shape-retaining diaphragm members matched in weight and resilience to vibrate and deflect substantially in unison in response to said vibratory and acceleration forces, respectively, to maintain a substantially constant spacing therebetween in response to said forces;

exposing only one of said pair of diaphragm members to said physical parameter to deflect relative to the other of said diaphragm members to change said spacing therebetween predictably in accord with the level of said parameter;

carrying a pair of variable capacitors on said pair of diaphragm members, defining said pair of variable capacitors by providing for each one an electrode carried by said one diaphragm member and a matching congruently confronting electrode carried by the other of said diaphragm members;

configuring said matching congruently confronting electrodes of said pair of varible capacitors to have area equality, geometric similarity and bilateral symmetry with respect to said pair of diaphragm members such that said pair of variable capacitors are substantially matched, change substantially equally in response to variation of said physical parameter; and further including the steps of providing a shield electrode upon one of said pair of capacitors, and configuring said shield electrode to share said bilateral symmetry with said pair of variable capacitors.

25. The method of claim 24 wherein configuring said matching congruently confronting electrodes includes making each of said electrodes of circular segment or semi-circular shape and spaced from another substantially identically shaped electrode, making the two electrodes on each diaphragm member cooperatively define substantially a full circle incomplete substantially only with respect to a diametrical space defined therebetween, and positioning said two electrodes on each diaphragm member symmetrically with respect to deflection of said diaphragm member in response to all of the physical parameter, vibration, and acceleration forces effective thereon.

26. The method of claim 24 wherein said step of providing said shield electrode includes the steps of providing an annular portion of electrode on said one diaphragm carrying said shield electrode, circumscribing the pair of segment shaped capacitor electrodes on said diaphragm with said annular portion of electrode proximate to but not connecting with either of said capacitor electrodes, providing a diametral cross bar electrode portion interposing between said pair of capacitor electrodes within said diametral space therebetween, and connecting said diametral cross bar electrode portion at its opposite ends with said annular electrode portion.

27. A capacitive pressure sensor comprising a housing including a pair of spaced apart circular diaphragm members matched in compliance to vibrate and deflect in substantial unison in response to vibratory and acceleration forces effective thereon, an outer one of said pair of diaphragm members bounding a reference-pressure chamber within which is movably disposed the other of said pair of diaphragm members; and said one diaphragm member deflecting in response to fluid pressure differential thereacross to move relative said other diaphragm member, first surface metalization film means carried by said pair of diaphragm members on confronting surfaces thereof for defining a pair of matched variable capacitors varying in capacitance value equally in response to relative movement of said pair of diaphragm members and for defining a plane of bilateral symmetry for said sensor, and second surface metalization film means carried also by said pair of diaphragm members on oppositely disposed surfaces thereof for balancing surface metalization residual stresses on each of said pair of diaphragm members, said second surface metalization film means including a portion thereof carried upon said one diaphragm member externally of said sensor for electrically shielding said pair of capacitors, further including a surface film shield metalization carried by said other diaphragm member and electrically connecting with said shielding portion of said second surface metalization film means.

28. The invention of claim 27 wherein said shield metalization includes an annular portion circumscribing that portion of said first surface metalization film means carried upon said other diaphragm member and a diametral cross-bar portion interposing between two substantially equal parts of said first surface metalization film means upon said other diaphragm member.

29. The invention of claim 27 further including additional surface film metalization externally disposed upon said sensor and disposed in shielding relation with said pair of variable capacitors electrically connecting with both said shielding portion of said second surface film metallization means and with said surface film shield metalization of said other diaphragm member.

30. Capacitive pressure sensor apparatus comprising:
a chambered housing of substantially non-conductive shape-retaining material; said housing including a comparatively thick and unyielding base portion, and a middle portion and top portion both of which are comparatively thinner and at least in part compliant, said housing portions being stacked and sealingly interbonded at outer regions thereof to cooperatively define a reference pressure chamber therewithin, a central region of each of said middle portion and top portion defining a respective diaphragm part, said diaphragm parts of said middle portion and top portion being spaced apart and matched in compliance to deflect and vibrate substantially in unison in response to acceleration and vibratory forces, respectively, acting upon said sensor apparatus; said diaphragm part of said top portion being outwardly exposed to ambient pressure and inwardly bounding said reference pressure chamber and movingly responding to pressure differences therebetween to move relative to said other diaphragm part; said diaphragm part of said middle portion spanning and being encompassed by said reference pressure chamber in isolation from ambient pressure;

four separate areas of capacitive surface metallization disposed two upon each one of said diaphragm parts of said top portion and middle portion within said reference pressure chamber as confronting spaced apart pairs, said four areas of surface metalization being of substantially identical geometric shape and area to define a plane of bilateral symmetry in said sensor, and each pair of surface metalization areas defining one of a pair of variable capacitors of equal value varying simultaneously and equally in response to movement of said one diaphragm part as the latter movingly responds to varying ambient pressure;

conductive means for individually connecting each of said four surface metalization areas externally of said sensor apparatus, said four separate metalization areas each being of circular segment shape or semi-circular, wherein the two surface metalization areas upon each of said diaphragm parts cooperatively define a substantially complete circular area, and each of said diaphragm parts also carrying a counter balancing area of surface metalization on the side thereof opposite to the two capacitive areas of surface metalization, each of said counter balancing areas of surface metalization being of similar area and shape to the combination of the two capacitive areas of surface metalization thereon.

31. The sensor apparatus of claim 30 further including spaced apart and electrically continuous areas of exteriorly disposed shielding surface metalization upon said sensor housing, said shielding surface metalization layers sandwiching said capacitive surface metalization therebetween.

32. The invention of claim 31 wherein said shielding surface metalization is continuous with an annular portion of shielding metalization carried upon said other diaphragm part and circumscribing said two capacitive metalization layers thereon, and a cross bar portion of shielding surface metalization also carried upon said other diaphragm part and interposing between said two capacitive metalization areas thereof.

* * * * *